United States Patent [19]

Muller

[11] 4,273,388
[45] Jun. 16, 1981

[54] AIR BRAKE SAFETY MECHANISM

[76] Inventor: Zdenek Muller, 2032 Kingsford, Sydney, New South Wales, Australia

[21] Appl. No.: 57,274

[22] Filed: Jul. 13, 1979

[51] Int. Cl.³ .............................. B60T 17/16; 303 89
[52] U.S. Cl. .......................................... 303/89; 92/28
[58] Field of Search ......................... 91/45; 92/22–25, 92/27, 28; 188/265

[56] References Cited

U.S. PATENT DOCUMENTS 3,472,124  10/1969  Roselius et al. .................. 303/89 X Primary Examiner—Duane A. Reger
Attorney, Agent, or Firm—Keith D. Beecher

[57] ABSTRACT

An air brake safety and parking mechanism is provided in the form of an emergency braking system which operates automatically to set and latch the air brakes of a vehicle in a braking position whenever the air pressure of the service braking system of the vehicle drops below a predetermined threshold, and which may be set and released mechanically for parking purposes. The air brake safety mechanism of the invention includes an antifriction ball screw coupled to the air brake piston in the air brake chamber of the vehicle braking system, and extending along a selected axis into an air-tight housing which is mounted adjacent to the brake chamber. A ball nut is rotatably mounted in the housing in threaded relationship with the screw to permit linear movement of the screw in both directions along the selected axis so long as the nut is freely rotatable. A latch engages the nut should the service pressure drop below a predetermined threshold to prevent rotation of the nut and, thereby, to prevent linear movement of the screw, so as to set and lock the air brakes of the vehicle.

7 Claims, 6 Drawing Figures

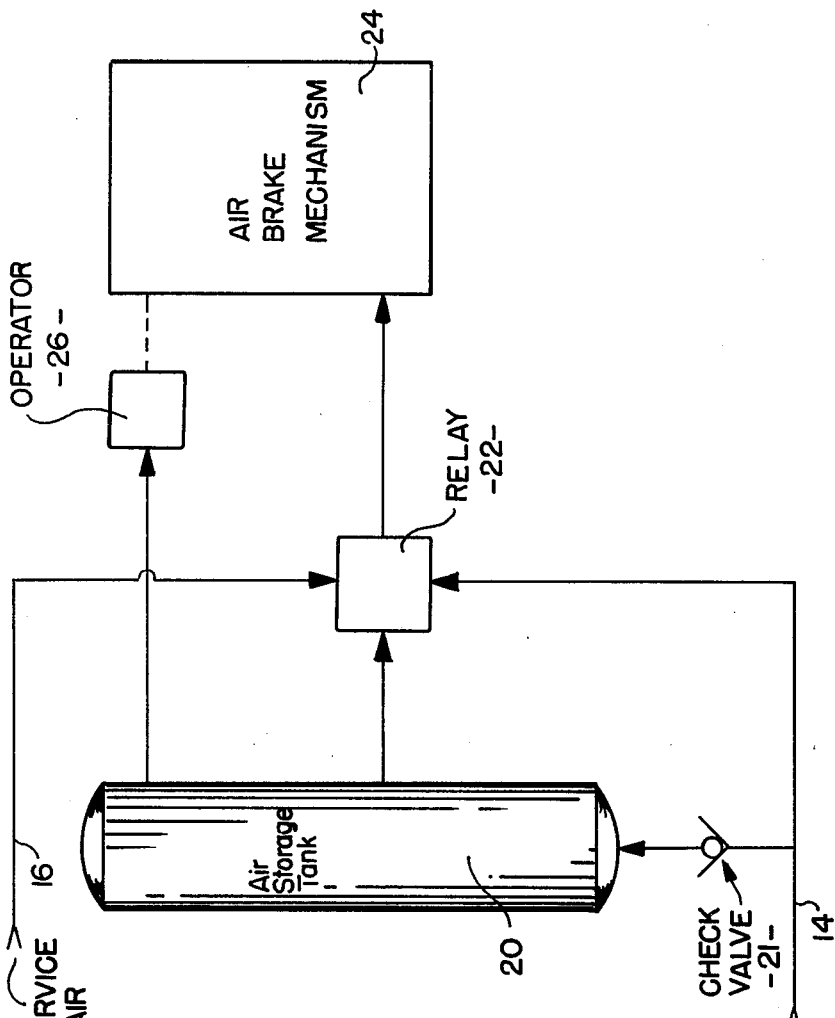
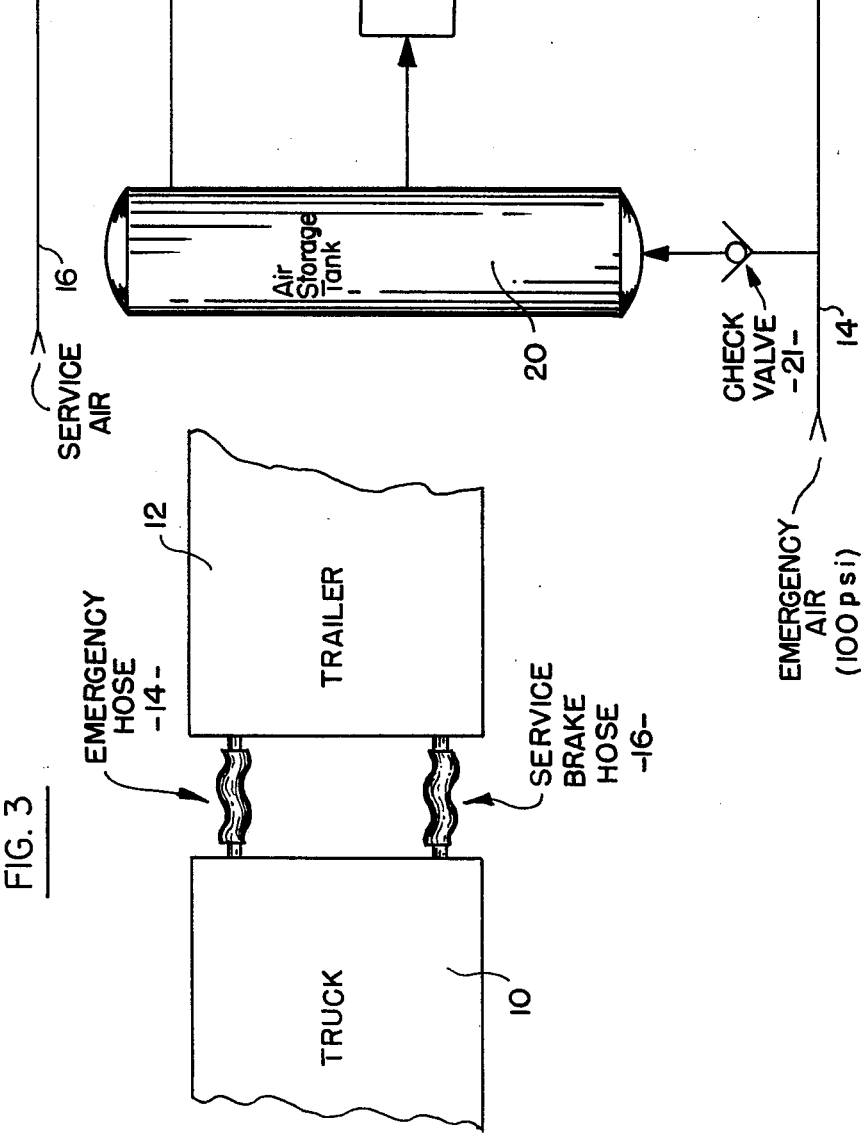

AIR BRAKE SAFETY MECHANISM

RELATED APPLICATION

Application Ser. No. 057,275 filed July 13, 1979 in the name of the present inventor.

BACKGROUND

Attempts have been made in the prior art to provide an emergency braking system for the air brakes of a vehicle, which will serve to prevent the runaway of the vehicle should the service air pressure of the braking system fail for any reason. Most prior art air brake emergency braking systems, however, are subject to certain disadvantages in that, in some instances, they are bulky and unduly complex. In other instances, considerable and expensive changes to the vehicle chassis are necessary in order to install the emergency braking systems. Moreover, some of the prior art emergency braking mechanisms are too expensive as to justify their installation.

Many of the prior art emergency braking mechanisms are merely auxiliary brakes which can be applied in the case of the air brakes malfunction. In other words, such prior art mechanisms do not operate automatically should the air brakes become ineffective, and there is no means to inform the operator of the vehicle in advance that the air brakes are not working. Still other prior art mechanisms act on the cam shift lever of the air brakes and cannot be applied in emergencies when the air brakes are out of adjustment.

Some of the prior art emergency braking systems can also be used for parking purposes. However, for the most part such prior art brakes can only be released by compressed air from the truck. Therefore, if such a prior art brake was installed in a trailer, there would be no way of moving the trailer unless a source of compressed air was available. The braking mechanism of the present invention has the feature in that it can be released and re-set mechanically and without the need for compressed air.

The present invention provides a relatively simple and inexpensive brake system which can be incorporated into trailers, tractors, trucks, buses or the like, and which can be easily installed in existing vehicles equipped with air brakes. The invention also provides a brake mechanism which is economical and efficient, and which rapidly and automatically sets and latches the air brakes of the vehicle whenever a failure in the service brake power system occurs, for any reason. Moreover, the invention provides a braking system which can be used for parking purposes, and which can easily be mechanically set, released and re-set.

Most heavy trucks and trailers are equipped with air brakes in which necessary pressure is built up and maintained in a storage tank by a compressor. Actuation of the brakes releases air under pressure against a diaphragm or piston in a brake chamber, which diaphragm or piston is operatively connected to the brake rods of the vehicle to set its brakes. The safety braking mechanism of the present invention operates in conjunction with such a braking system and, as mentioned above, serves to set and latch the brakes of the vehicle whenever the air pressure in the air braking system falls below a predetermined threshold.

Accordingly, a primary objective of the present invention is to provide a braking mechanism which is particularly adapted for use in conjunction with motor vehicles of the type using air brakes which necessitate a source of air under pressure for their operation, the braking mechanism of the invention being adapted to set and latch the brakes of the vehicle at any time that there is insufficient air pressure from the source.

Another objective of the present invention is to provide an improved braking mechanism which is adapted to set and latch the brakes of the vehicle whenever the air braking system is in an abnormal condition, the mechanism of the invention incorporating a minimum number of parts so that it is not only subject to simple and trouble-free operation, but it also lends itself to economical mass production. Another object of the present invention is to provide such a braking system which serves to set and latch the air brakes under emergency conditions, as when the air hose is broken, or become disconnected, or is leaking; and which may also serve as a parking brake for the vehicle when there is no air pressure available.

Another objective of the invention is to provide such an emergency and parking brake mechanism which aplies a mechanical lock to the brakes when set, which is not dependent on a compressed air source which could be subject to leakage, and which has no tendency to fail when it has been set.

Yet another objective of the invention is to provide such an improved emergency and parking brake mechanism which may be mechanically released (for example, by a special tool to prevent vandalism), should it become necessary to move a parked trailer, or the like, when no source of compressed air is available.

BRIEF DESCRIPTION OF THE DRAWINGS

FIG. 3 is a schematic representation of a truck and trailer vehicle, and showing the air hose connections between the truck and trailer; and FIG. 4 is a schematic diagram of the service air braking system, and also illustrating certain components of the present invention which are incorporated into the system.

DETAILED DESCRIPTION OF THE ILLUSTRATED EMBODIMENT

Figure 1:
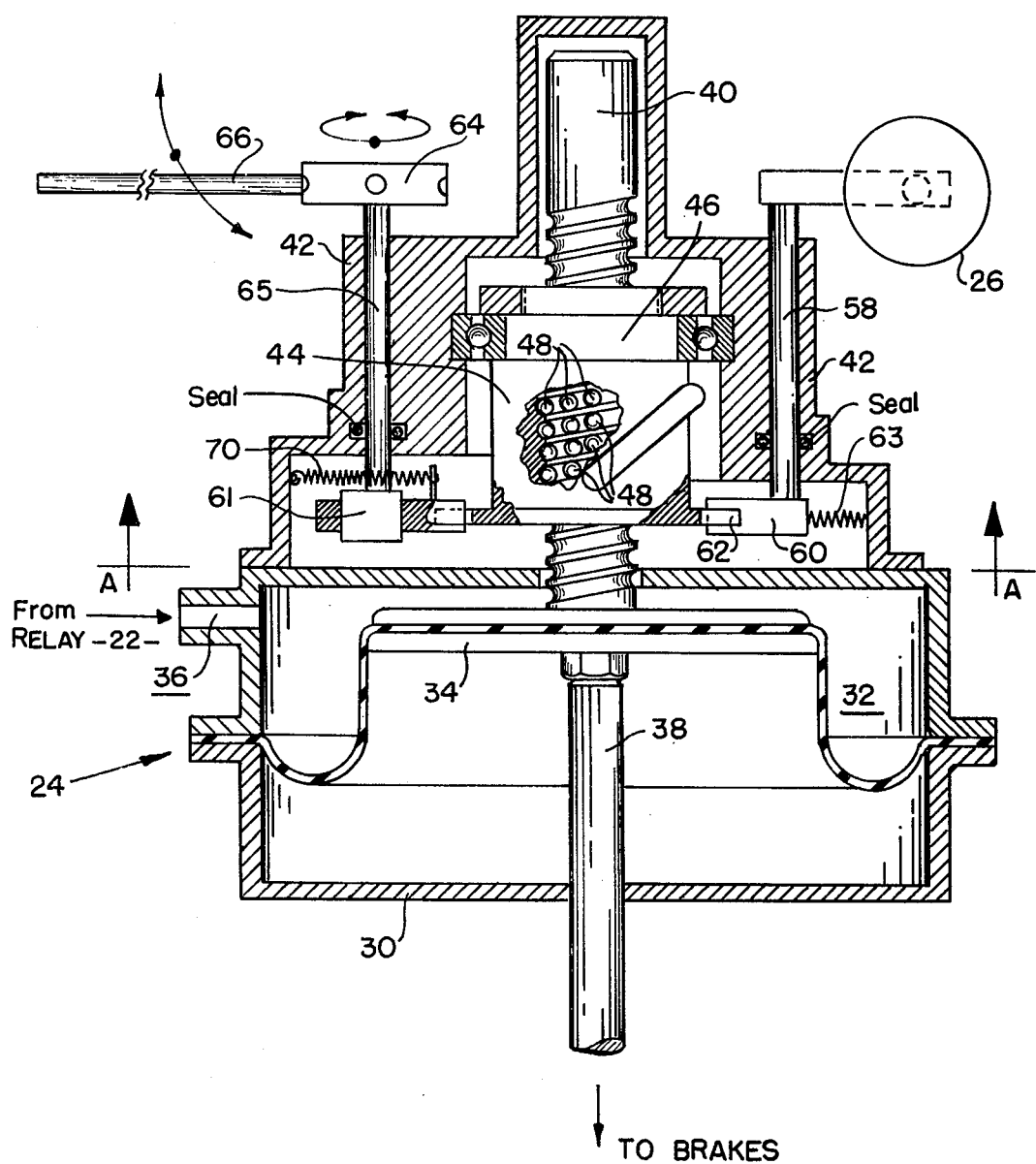
FIG. 1 is a side sectional view of an air brake control mechanism which includes a safety mechanism constructed in accordance with one embodiment of the invention.

As shown in FIG. 3, the air braking system of a truck 10 is coupled to the braking mechanism of a trailer 12 through a service air hose 16 and also through an emergency air hose 14. As shown in FIG. 4, the air braking mechanism of the trailer includes an air storage tank 20 which, for example, is coupled to an appropriate compressor in the truck by way of the emergency hose 14, so that the air pressure within the tank may be maintained at a particular pressure of, for example, 100 psi.

The air tank 20 is coupled to a relay 22. Relay 22 is operated by the application of service air pressure from the braking control mechanism of the truck to introduce service air pressure from the air storage tank 20 to the air brake mechanism 24 of the trailer. The service air pressure has a value, for example, of from 0–100 psi, as the service brakes are operated in the truck.

As shown in FIG. 4, the emergency air hose 14 is coupled to the air storage tank 20 in the trailer through a check valve 21, and the emergency air hose is also connected to the relay 22. The air storage tank 20 is also connected by an appropriate hose to an operator 26, which forms a part of the safety mechanism of the present invention, the operator being connected to the air brake mechanism 24, as will be described. The operator 26 functions in accordance with the concepts of the present invention to apply a latch to the air brakes, whenever the air pressure in storage tank 20 falls below a predetermined level so as to prevent the release of the brakes of the trailer.

During normal operation, the air compressor in the truck supplies air, for example, at 100 psi pressure through the emergency hose 14 and through check valve 21 to the air storage tank 20 to maintain that pressure in the storage tank. The air at 100 psi pressure is also supplied through the emergency hose to relay 22. Should the pressure applied to relay 22 through emergency hose 14 ever fall below a particular threshold of, for example, 65 psi, the relay is actuated to release the high pressure (100 psi) air from the storage tank 20 to the air brakes mechanism 24 causing the vehicle brakes to set, regardless of the service air pressure in the hose 16. Now, should the air pressure in tank 20 fall below a second threshold of, for example, 45 psi, the operator 26 then responds to lock the air brakes of the vehicle in their set position, effectively braking the vehicle.

As stated above, FIG. 1 is a side section of the air brake mechanism 24, and it includes a housing 30 which forms an air brake chamber 32. A piston-diaphragm combination 34 is movable in the brake chamber 32 in response to service air introduced into the chamber from relay 22 through a port 36. In response to the varying pressures of the service air, as the brakes of the vehicle are operated, the piston 34 moves back and forth in the brake chamber 32, causing a rod 38 to operate the brakes of the vehicle.

As shown in FIG. 1, an anti-friction ball screw 40 is attached to the opposite side of piston-diaphragm combination 34 from the rod 38, and ball screw 40 is held against rotation by the diaphragm of combination 34. The ball screw extends into an air-tight housing 42. A ball nut 44 is rotatably mounted in the housing on a thrust bearing 46, in threaded engagement with the screw 40. A multiplicity of balls 48 are interposed between the nut 46 and the threads of screw 40. So long as nut 44 is freely rotatable in the housing 42, the screw 40 may move linearly in either direction along its longitudinal axis, so that the brake mechanism 24 may respond to service air from relay 22 to operate the brakes of the vehicle. However, should the nut 44 be latched, it immediately prevents any movement of the screw 40.

Figure 2A:
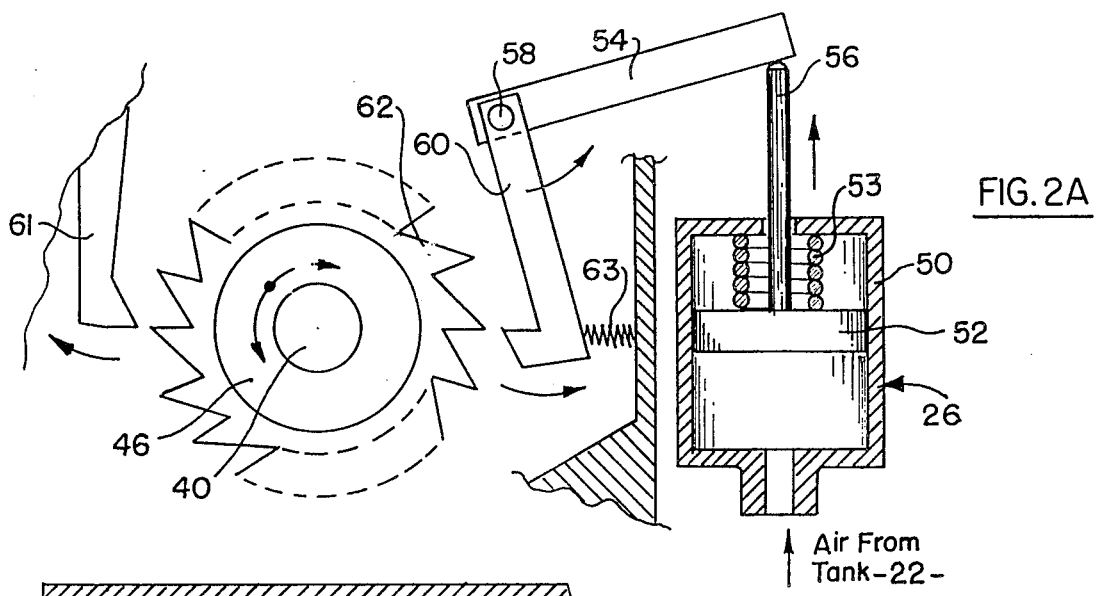
FIGS. 2A, 2B and 2C are cross-sections of the mechanism of FIG. 1 taken essentially along the line A—A of FIG. 1, and representing the mechanism in three different operating conditions.
Figure 2B:
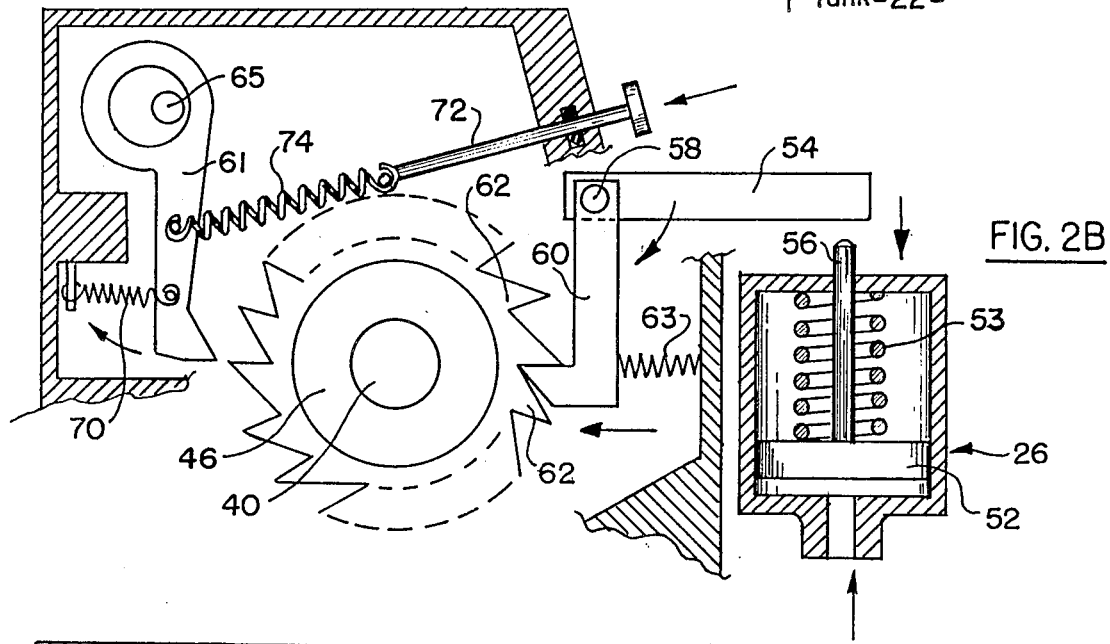
Figure 2C:
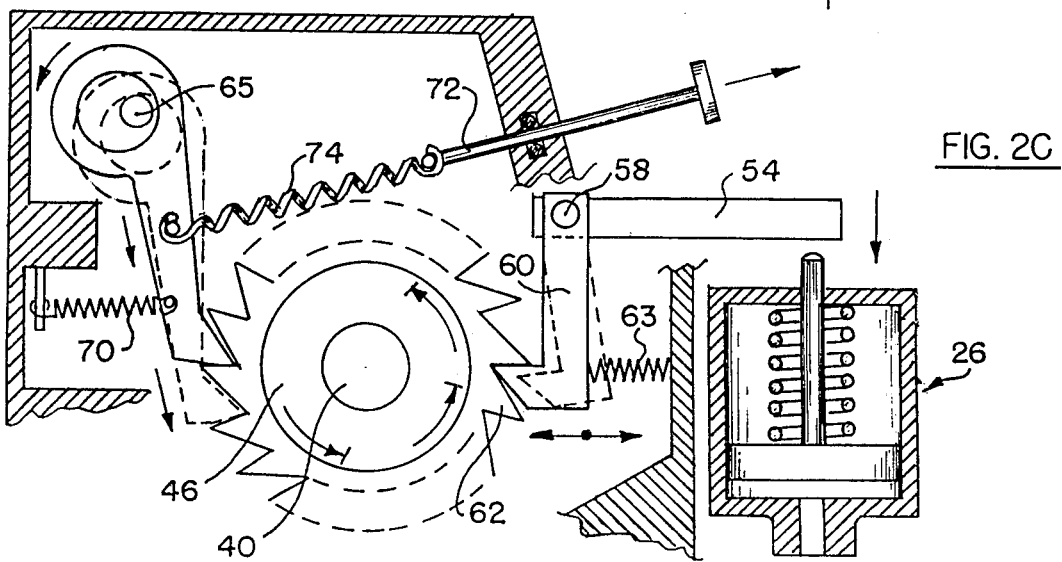

The latching of nut 44 is controlled by the operator 26 which, as shown in FIGS. 2A, 2B and 2C comprises a cylinder-piston combination including a cylinder 50 and a piston 52. Piston 52 engages a lever 54 through a piston rod 56, lever 54 being pivotally coupled to housing 42 by a shaft 58. A latch 60 is attached to the lever 54, to rotate from one angular position to another, as the lever is moved. The latch 60 engages a ratchet 62 formed integral with the nut 44. Whenever the pressure in the tank 20 falls below a particular level, the piston 52 is moved to the position of FIG. 2B by a return spring 53, so that latch 60 engages the ratchet 62. When that occurs, rotation of nut 44 is prevented in one direction only, so as to prevent upward movement of the screw 50 in FIG. 1 and release the brakes of the vehicle.

Accordingly, the operation of the mechanism is such that should the air pressure of the system drop below the selected level of, for example, 65 psi, relay 22 will cause the pressure stored in air storage tank 20 to enter the port 36 of the brake mechanism 24 of FIG. 1 so as to set the brakes of the vehicle. Then, should the pressure drop still further, to below, for example, 45 psi, the operator 26 will release to its position of FIG. 2B, causing the latch 60 to engage ratchet 62, to prevent the release of the brakes. Latch 60 is moved into engagement with ratchet 62 by a spring 65.

After the braking mechanism has been set, it can be released by the introduction of compressed air to operator 26. Also, the brake can be released manually, if no compressed air is available, by turning shaft 28 by appropriate manual means. It is preferred that a special key be provided for that purpose, so as to prevent the release of the brake by unauthorized persons.

The mechanism of FIG. 1 also includes a second latch 61 which is mounted on the end of a shaft 65 which, in turn, is rotatably mounted in housing 42. An appropriate torque limiting shift clutch 64 is mounted on the upper end of shaft 65, and a handle 66 is inserted into the clutch 64. Manual movement of the handle will turn the shaft 65 to cause latch 61 to engage the ratchet 62, as shown in FIG. 2C. As shown in FIGS. 2B and 2C, latch 61 is eccentrically mounted on the lower end of shaft 65, so that as the shaft is turned, the latch 61 will engage the ratchet 62, and will move downwardly in FIG. 2C to turn the ratchet 62, and thus the nut 44 in a direction to move the screw 40 downwardly in FIG. 1 so as to set the brakes of the vehicle.

Latch 61 is normally held in a disengaged position by a spring 70 (FIGS. 2B and 2C), and can be moved to its engaged position by pulling a rod 72, which is coupled to latch 60 through a spring 74. Spring 74 is stronger than spring 70, so that when the rod 72 is pulled, the latch 61 is pulled into engagement with the ratchet 62, as shown in FIG. 2C.

In some instances, the rod 72 may be unnecessary, as where there is sufficient friction between shaft 65 and the latch 61, so that when the shaft is turned, the latch is moved into engagement with the ratchet 62. The latch 61, and its associated manually operated mechanism permits manual setting of the brakes, where there is no air pressure, for example, for parking purposes.

The invention provides, therefore, an improved emergency and parking braking mechanism which operates automatically in response to a drop in air pressure below a predetermined threshold to set and lock the brakes of the vehicle, and which also may be controlled manually to set the brakes, when so desired.

While a particular embodiment of the invention has been shown and described, modifications may be made. It is intended in the claims to cover the modifications which come within the true spirit and scope of the invention.

What is claimed is:

1. A fluid operated braking mechanism for a vehicle, comprising: a brake chamber; a movable member mounted in said brake chamber and responsive to fluid pressure introduced into said chamber for operating the brakes of the vehicle; a housing mounted adjacent to said brake chamber; and elongated screw affixed to said movable member in said brake chamber and extending into said housing for linear movement in both directions along a particular axis, said movable member holding said elongated screw against rotation; a nut positioned in coaxial relationship with said screw and in threaded relationship with said screw to permit such linear movement of said screw along said axis so long as said nut is freely rotatable; bearing means mounting said nut in said housing to cause said nut to be freely rotatable, said nut having an annular ratchet extending around its periphery; a latch mounted in said housing; and operator means for said latch for causing said latch to move from a disengaged position to a second position in which it engages said ratchet on the nut and prevents rotation of the nut in one direction only when the fluid pressure for the braking mechanism drops below a predetermined threshold.

2. The braking mechanism defined in claim 1, in which said operator means includes a cylinder and piston combination which normally holds said latch in its disengaged position and which responds to a drop in fluid pressure in the braking mechanism to below said threshold to move to its second position.

3. The braking mechanism defined in claim 1, and which includes a multiplicity of balls interposed between the nut and the screw.

4. The braking mechanism defined in claim 1, and which includes a second latch mounted in said housing, and which includes manually operable means coupled to the second latch to cause the second latch to engage said ratchet to turn said nut through a certain angular displacement for setting the brakes of the vehicle.

5. The braking mechanism defined in claim 4, in which said manually operable means comprises a shaft rotatably mounted in said housing and eccentrically coupled to said latch, and handle means connected to said shaft.

6. The braking mechanism defined in claim 1, and which includes a shaft rotatable mounted in said housing, said latch being mounted on said shaft.

7. The braking mechanism defined in claim 6, in which said shaft may be rotated manually to release the brake.

* * * * *